US012266300B2

(12) United States Patent
Guan

(10) Patent No.: US 12,266,300 B2
(45) Date of Patent: Apr. 1, 2025

(54) DISPLAY DRIVER INTEGRATED CIRCUIT HAVING EMBEDDED RESISTIVE RANDOM ACCESS MEMORY AND DISPLAY DEVICE HAVING SAME

(71) Applicant: HEFEI RELIANCE MEMORY LIMITED, Hefei (CN)

(72) Inventor: Ximeng Guan, San Jose, CA (US)

(73) Assignee: Hefei Reliance Memory Limited, Hefei (CN)

( * ) Notice: Subject to any disclaimer, the term of this patent is extended or adjusted under 35 U.S.C. 154(b) by 0 days.

(21) Appl. No.: 17/642,551

(22) PCT Filed: Aug. 12, 2020

(86) PCT No.: PCT/US2020/045871

§ 371 (c)(1),
(2) Date: Mar. 11, 2022

(87) PCT Pub. No.: WO2021/050191

PCT Pub. Date: Mar. 18, 2021

(65) Prior Publication Data

US 2022/0328000 A1 Oct. 13, 2022

Related U.S. Application Data

(60) Provisional application No. 62/899,621, filed on Sep. 12, 2019.

(51) Int. Cl.
*G09G 3/3233* (2016.01)

(52) U.S. Cl.
CPC ... *G09G 3/3233* (2013.01); *G09G 2300/0819* (2013.01); *G09G 2300/0828* (2013.01); *G09G 2300/0842* (2013.01)

(58) Field of Classification Search
CPC ...... G09G 3/32; G09G 3/3208; G09G 3/3225; G09G 3/3233; G09G 3/3266;
(Continued)

(56) References Cited

U.S. PATENT DOCUMENTS 6,753,562 B1 * 6/2004 Hsu .................... G11C 11/5607 257/E27.005
7,499,322 B2 3/2009 Lee et al.
(Continued)

FOREIGN PATENT DOCUMENTS

CN 101256828 A 9/2008
CN 210436632 U 4/2010
(Continued)

OTHER PUBLICATIONS

PCT International Search Report and the Written Opinion mailed Nov. 4, 2020, issued in related International Application No. PCT/US2020/045871 (14 pages).
(Continued)

*Primary Examiner* — Amare Mengistu
*Assistant Examiner* — Jennifer L Zubajlo
(74) *Attorney, Agent, or Firm* — Sheppard Mullin Richter & Hampton LLP

(57) ABSTRACT

A display driver integrated circuit includes an input port configured to receive a display sensing signal for a display panel; a resistive random access memory coupled to the input port and configured to store a sensing value indicative of the display sensing signal; a display compensation logic coupled to the resistive random access memory to receive the sensing value and configured to determine, based on the sensing value, a compensation value to enable the display panel to modify a display control signal; and an output port coupled to the display compensation logic to transmit a display compensation voltage signal to the display panel.
(Continued)

The display compensation voltage signal is generated based on the compensation value.

35 Claims, 5 Drawing Sheets

(58) Field of Classification Search
CPC .. G09G 3/3275; G09G 3/3283; G09G 3/3291; G09G 3/3648; G09G 3/3655; G09G 3/3696; G09G 2310/0264; G09G 2300/0819; G09G 2300/0828; G09G 2300/0842
See application file for complete search history.

(56) References Cited

U.S. PATENT DOCUMENTS

| | | | | |
|---|---|---|---|---|
| 10,222,683 | B2 | 3/2019 | Kitagawa | |
| 10,354,590 | B2 | 7/2019 | Nie et al. | |
| 10,679,533 | B2 | 6/2020 | Chaji et al. | |
| 11,244,612 | B2 | 2/2022 | Ok et al. | |
| 11,410,614 | B2 | 8/2022 | Zahirovic et al. | |
| 11,557,264 | B2 | 1/2023 | Zhao et al. | |
| 2009/0295764 | A1 | 12/2009 | Lin et al. | |
| 2016/0125843 | A1 | 5/2016 | Kim et al. | |
| 2017/0221562 | A1* | 8/2017 | Buchanan | G11C 13/0064 |
| 2018/0005579 | A1* | 1/2018 | Brahma | G09G 3/3258 |
| 2018/0018913 | A1* | 1/2018 | Kim | G09G 3/2092 |
| 2018/0308416 | A1 | 10/2018 | Chen | |
| 2019/0080731 | A1 | 3/2019 | Kavalieros et al. | |
| 2019/0086730 | A1 | 3/2019 | Huang | |
| 2019/0130811 | A1 | 5/2019 | Yonezawa | |
| 2019/0156747 | A1* | 5/2019 | Nie | G09G 3/3233 |

FOREIGN PATENT DOCUMENTS

| | | | |
|---|---|---|---|
| CN | 101944314 | A | 1/2011 |
| CN | 102725786 | A | 10/2012 |
| CN | 106328061 | A | 1/2017 |
| CN | 106488083 | A | 3/2017 |
| CN | 106531045 | A | 3/2017 |
| CN | 107221290 | A | 9/2017 |
| CN | 107396022 | A | 11/2017 |
| CN | 107610661 | A | 1/2018 |
| CN | 107767327 | A | 3/2018 |
| CN | 108377370 | A | 8/2018 |
| CN | 108877631 | A | 11/2018 |
| CN | 108877666 | A | 11/2018 |
| CN | 108962139 | A | 12/2018 |
| JP | 2014-071184 | A | 4/2014 |
| WO | 2015/141730 | A1 | 9/2015 |
| WO | 2017/037228 | A1 | 3/2017 |
| WO | 2018/057766 | A1 | 3/2018 |

OTHER PUBLICATIONS

PCT International Preliminary Report on Patentability mailed Mar. 15, 2022, issued in related International Application No. PCT/US2020/045871 (12 pages).
Extended European Search Report dated Sep. 9, 2022, issued in related European Application No. 20863235.6 (18 pages).
Office Action dated Nov. 15, 2023, issued in related Korean Patent Application No. 10-2022-7011518, with English machine translation (13 pages).
First Office Action and Search Report dated Jun. 5, 2024, issued in related Chinese Application No. 202080013358.1, with English machine translation (19 pages).
Examination Report dated Jul. 30, 2024, issued in related European Patent Application No. 20863235.6 (10 pages).

* cited by examiner

200

500

DISPLAY DRIVER INTEGRATED CIRCUIT HAVING EMBEDDED RESISTIVE RANDOM ACCESS MEMORY AND DISPLAY DEVICE HAVING SAME

CROSS REFERENCE TO RELATED APPLICATIONS

This application is a national stage application under 35 U.S.C. § 371 of PCT Application No. PCT/US2020/045871, filed Aug. 12, 2020, entitled "DISPLAY DRIVER INTEGRATED CIRCUIT HAVING EMBEDDED RESISTIVE RANDOM ACCESS MEMORY AND DISPLAY DEVICE HAVING SAME" which is based on and claims benefits of U.S. provisional application No. 62/899,621, filed Sep. 12, 2019, entitled "EMBEDDED RRAM FOR DISPLAY PIXEL COMPENSATION".

TECHNICAL FIELD

The disclosure is related generally to display driver integrated circuits, and more particularly to display driver integrated circuits having embedded resistive random access memory and display devices having the display driver integrated circuits.

BACKGROUND

Display driver integrated circuits (DDIC) provide interface functions between a particular microprocessor/microcontroller/application-specific integrated circuit (ASIC)/interface, and a particular display device including but not limited to a liquid crystal display (LCD), a light emitting diode (LED) display, an organic light emitting diode (OLED) display, etc. The display driver typically accepts commands and data through an industry-standard general-purpose interface, and generates signals with a suitable voltage/current/timing to make the display show the desired images.

A DDIC may also provide a pixel compensation function. A display panel ages after a constant, long-time electrical stress. For example, a display panel generally includes tens of thousands of display pixels that can be controlled to display images or moving pictures. Each of the display pixels may include a thin-film transistor (TFT) used to drive a display element. After long use, both thin-film transistor and the display element may be subject to electrical stress that temporarily or permanently changes their characteristics, which in turn affect the display quality.

Because the aging of the display panel depends on the usage of the display panel, it cannot be pre-compensated. As a result, a display panel generally is equipped with a DDIC that can compensate for changing characteristics of the TFT driver and/or the display elements.

SUMMARY

One aspect of the present disclosure is directed to a display driver integrated circuit. The display driver integrated circuit includes an input port configured to receive a display sensing signal for a display panel; a resistive random access memory coupled to the input port and configured to store a sensing value indicative of the display sensing signal; a display compensation logic coupled to the resistive random access memory to receive the sensing value and configured to determine, based on the sensing value, a compensation value to enable the display panel to modify a display control signal; and an output port coupled to the display compensation logic to transmit a display compensation voltage signal to the display panel. The display compensation voltage signal is generated based on the compensation value. In some embodiments, the display sensing signal is indicative of a current flowing through a display pixel of the display panel and a display-pixel driving element coupled to the display pixel.

In some embodiments, the display driver integrated circuit further includes a digital-analog converter coupled to the display compensation logic and configured to convert the compensation value into the display compensation voltage signal. In some embodiments, the display driver integrated circuit further includes an integrator amplifier coupled to the input port and configured to convert display sensing signal to a sensed voltage signal. In some embodiments, the display driver integrated circuit further includes an analog-digital converter coupled to the integrator amplifier and configured to obtain and convert the sensed voltage signal into the sensing value for storage in the resistive random access memory.

In some embodiments, the display driver integrated circuit further includes a comparator coupled to the integrator amplifier and configured to obtain and compare the sensed voltage signal with a reference voltage signal and to generate a digital value as the sensing value for storage in the resistive random access memory.

In some embodiments, the display driver integrated circuit further includes a current comparator coupled to the input port and configured to obtain and compare the display sensing signal with a reference current signal and to generate a digital value as the sensing value for storage in the resistive random access memory. The display sensing signal is indicative of a current flowing through a display-pixel driving element coupled to a display element.

One aspect of the present disclosure is directed to a display driver integrated circuit. The display driver integrated circuit includes an input port configured to receive a display sensing signal for the display panel, an integrator amplifier coupled to the input port and configured to convert display sensing signal to a sensed voltage signal, a first voltage amplifier coupled to the integrator amplifier and configured to amplify the sensed voltage signal to generate an analog sensing signal, a resistive random access memory coupled to the first voltage amplifier and configured to store the analog sensing signal, a second voltage amplifier coupled to the resistive random access memory and configured to amplify the analog sensing signal to generate a display compensation voltage signal, and an output port coupled to the second voltage amplifier to transmit the display compensation voltage signal to the display panel.

In some embodiments, the first voltage amplifier is configured to amplify the sensed voltage signal to generate the analog sensing signal based on resistive states of the resistive random access memory.

Another aspect of the present disclosure is directed to a display device. The display device includes a display panel and a display driver integrated circuit coupled to the display panel to control the display panel. The display driver integrated circuit includes an input port configured to receive a display sensing signal for a display panel; a resistive random access memory coupled to the input port and configured to store a sensing value indicative of the display sensing signal; a display compensation logic coupled to the resistive random access memory to receive the sensing value and configured to determine, based on the sensing value, a compensation value to enable the display panel to modify a display control signal; and an output port coupled to the display compensation logic to transmit a display compensation voltage signal to the display panel. The display compensation voltage signal is generated based on the compensation value.

Another aspect of the present disclosure is directed to a display device. The display device includes a display panel and a display driver integrated circuit coupled to the display panel to control the display panel. The display driver integrated circuit includes an input port configured to receive a display sensing signal for the display panel, an integrator amplifier coupled to the input port and configured to convert display sensing signal to a sensed voltage signal, a first voltage amplifier coupled to the integrator amplifier and configured to amplify the sensed voltage signal to generate an analog sensing signal, a resistive random access memory coupled to the first voltage amplifier and configured to store the analog sensing signal, a second voltage amplifier coupled to the resistive random access memory and configured to amplify the analog sensing signal to generate a display compensation voltage signal, and an output port coupled to the second voltage amplifier to transmit the display compensation voltage signal to the display panel.

These and other features of the apparatuses, systems, and methods, disclosed herein, as well as the methods of operation and functions of the related elements of structure, will become more apparent upon consideration of the following description and the appended claims with reference to the accompanying drawings, all of which form a part of this specification. It is to be expressly understood, however, that the drawings are for purposes of illustration and description only and are not intended as a definition of the limits of the disclosure. It is to be understood that the foregoing general description and the following detailed description are exemplary and explanatory only, and are not restrictive of the disclosure, as claimed.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings. Non-limiting embodiments of the disclosure may be more readily understood by referring to the following drawings.

DETAILED DESCRIPTION OF EMBODIMENTS

Non-limiting embodiments of the present disclosure will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present disclosure. Various changes and modifications obvious to one skilled in the art to which the present disclosure pertains are deemed to be within the spirit, scope and contemplation of the present disclosure as further defined in the appended claims.

Techniques disclosed herein provide DDICs that can compensate display pixels for their display quality changes. The DDICs may include embedded resistive random access memory (RRAM) that can reduce chip size, energy consumption, and cost for the circuitry. The solutions provided herein improve the performance of the DDICs and the display devices that are equipped with the DDICs.

Figure 1:
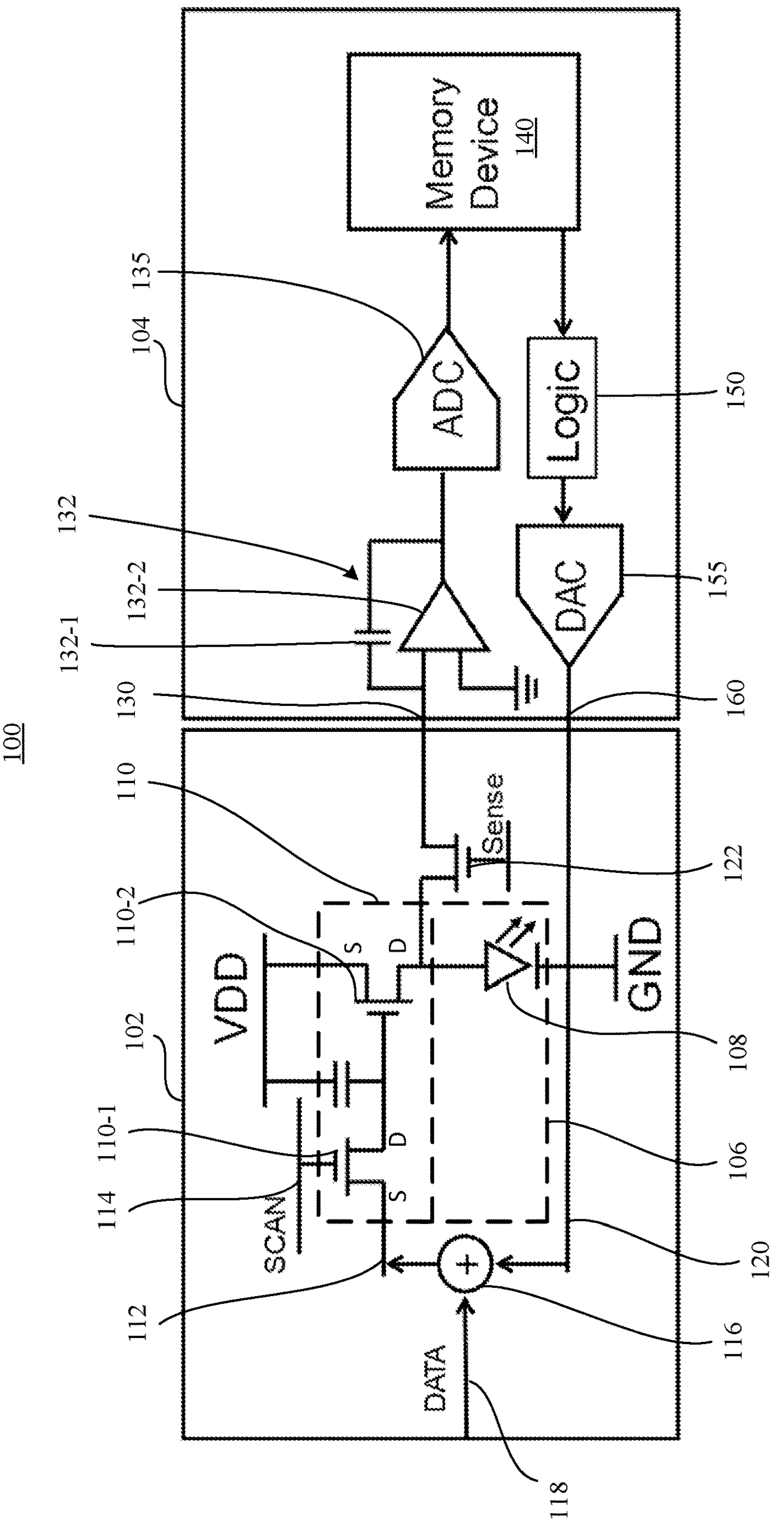
FIG. 1 is a diagram illustrating a display device that includes a display driver integrated circuit, according to one example embodiment.

Embodiments will now be explained with accompanying figures. Reference is first made to FIG. 1. FIG. 1 is a diagram illustrating a display device 100, according to one example embodiment. The display device 100 includes a display panel 102 and a DDIC 104. The display panel 102 includes a pixel array having a plurality of pixels. One example pixel 106 is shown in FIG. 1. The pixel 106 includes a display element 108 and a display-pixel driving element 110 configured to control the display element 108. The display element 108 may be any element that emits light, such as an LCD cell, an LED, an OLED, etc. In the illustrated embodiment, the display element 108 is an OLED. The display-pixel driving element 110 may include one or more diodes, one or more transistors, a combination thereof, or other circuits. In the illustrated embodiment, the display-pixel driving element 110 includes two thin-film transistors 110-1 and 110-2.

The pixel 106 is connected to a data line 112 to receive a data signal/display control signal and to a scan line 114 to receive a scan signal (SCAN). Although not shown in FIG. 1, the display panel includes a plurality of data lines 112 and a plurality of scan lines 114. The data line 112 is coupled to a data source 116 that provides the data signal based on a display data input (DATA) 118 and a compensation signal 120 provided by the DDIC 104. A gate of the TFT 110-1 is connected to the scan line 114; a source of the TFT 110-1 is connected to the data line 112; and a drain of the TFT 110-1 is connected to a gate of the TFT 110-2. A source of the TFT 110-2 is connected to a voltage VDD, and a drain of the TFT 110-2 is connected to the display element 108. One end of the display element 108 is connected to the drain of the TFT 110-2 while another end of the display element 108 is connected to the ground. When a scan signal from the scan line 114 opens the gate of the TFT 110-1, the data signal is supplied from the data line 112 to control the gate of the TFT 110-2. Depending on a magnitude of this control signal to the gate of the TFT 110-2, a variable current may be supplied from VDD to the display element 108, causing the display element 108 to dim or light.

To provide compensation to the pixel 106, the display panel 102 further includes a sensing element 122. The sensing element 122 may include one or more diode, one or more transistor, a combination thereof, or other circuits. In the illustrated embodiment, the sensing element 122 is a TFT. The sensing element 122 is connected between the pixel 106 and an input port 130 of the DDIC 104. The sensing element 122 may be configured to sense a display sensing signal. For example, the display sensing signal may include a current flowing through the TFT 110-2 of the display-pixel driving element 110, a current flowing through the display element 108, and/or a current flowing through both the TFT 110-2 of the display-pixel driving element 110 and the display element 108.

Figure 5:
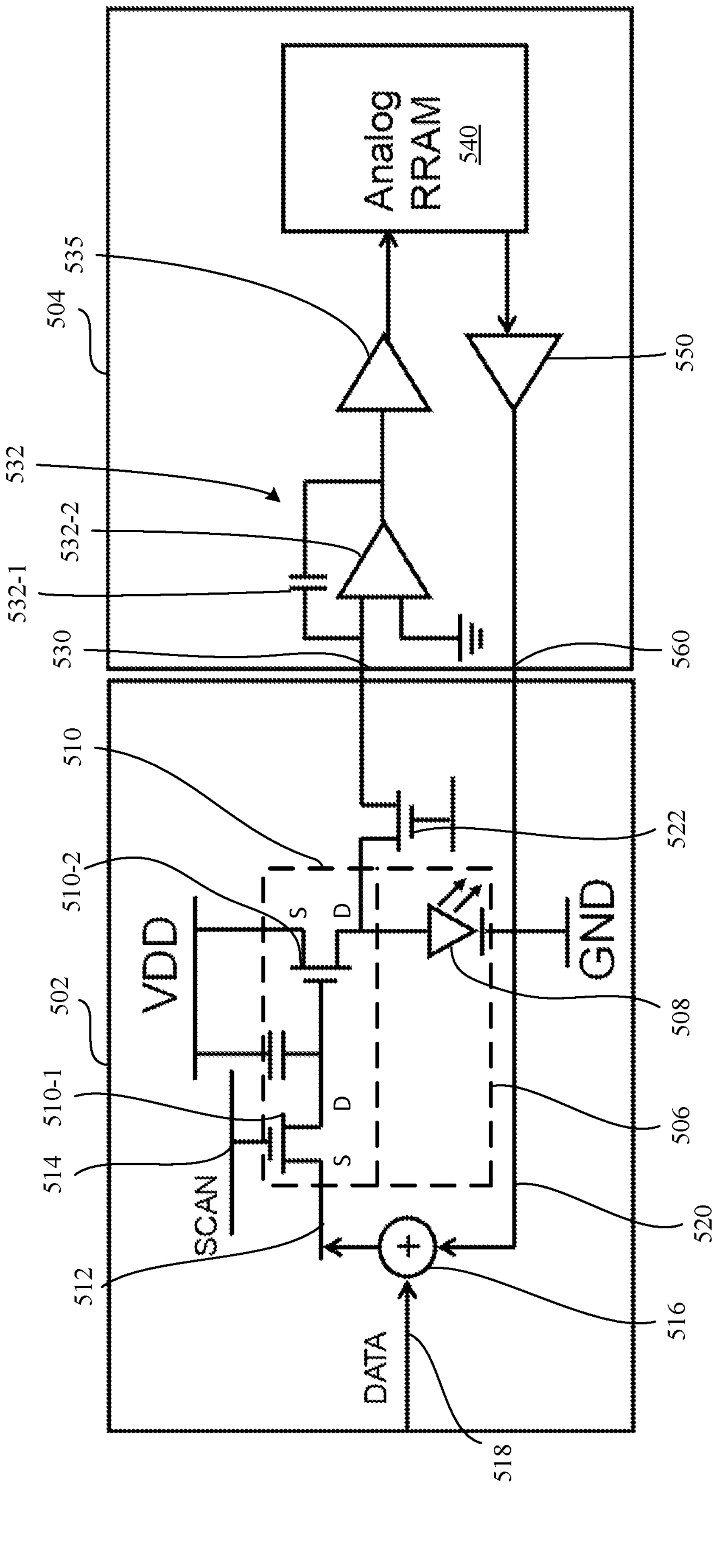
FIG. 5 is a diagram illustrating yet another display device that includes a display driver integrated circuit, according to one example embodiment.

The DDIC 104 includes the input port 130, a memory device 140, a display compensation logic 150, and an output port 160. The input port 130 is configured to receive a display sensing signal for the display panel 102. For example, the input port 130 may receive the display sensing signal from the sensing element 122 of the display panel. The memory device 140 is coupled to the input port 130 and configured to store a sensing value indicative of the display sensing signal. The memory device 140 includes a resistive random access memory (RRAM). The RRAM 140 may be operated in a digital mode (FIG. 1) or in an analog mode (FIG. 5). In the conventional art, the memory device may be an on-chip static random access memory (SRAM), an off-chip NOR flash, or the like. A memory cell of an SRAM generally requires six transistors, while a memory cell of an RRAM needs one transistor and thus consumes less chip area. Moreover, an SRAM is volatile and requires standby power to retain data, while the RRAM is non-volatile and uses less power as it does not need standby power to retain data. The RRAM requires comparable or lower read current than an SRAM array. Further, an RRAM array has a faster response than an SRAM array. Drawbacks of an off-chip NOR flash for the memory device 140 may include limited input/output bandwidth, high power consumption, and higher cost.

The display compensation logic 150 is coupled to the RRAM 140 to receive the sensing value and configured to determine, based on the sensing value, a compensation value to enable the display panel 102 to modify a display control signal (e.g., DATA). For example, the display compensation logic 150 may be programmed to include a look-up table for the compensation value. The display compensation logic 150 may read the sensing value and determine a corresponding compensation value based on the look-up table.

The output port 160 is coupled to the display compensation logic 150 to transmit a display compensation voltage signal to the display panel 102. The display compensation voltage signal is generated based on the compensation value. The data source 116 receives the display compensation voltage signal 120 and the display data input (DATA) 118 to generate the data signal for the display pixel 106. In one embodiment, the data source 116 is an adder that adds the display compensation voltage signal 120 and the display data input (DATA) 118 to generate the data signal for the display pixel 106.

In some embodiments, the DDIC 104 may further include a digital-analog converter (DAC) 155 coupled to the display compensation logic 150 and configured to convert the compensation value received from the display compensation logic 150 into the display compensation voltage signal 120. For example, the compensation value received from the display compensation logic 150 may be a digital value indicating a level of compensation for the display pixel 106. The DAC 155 converts the digital value into the analog display compensation voltage signal, which can be used by the data source 116 in the display panel 102 to generate a data signal for the display pixel 106.

In some embodiments, the DDIC 104 may further include an integrator amplifier 132 coupled to the input port 130 and configured to convert the display sensing signal received from the input port 130 to a sensed voltage signal. For example, an output of the sensing element 122 may provide a current signal (displaying sensing signal) to the input port 130 of the DDIC. This current signal is converted to a voltage signal (sensed voltage signal) at the integrator amplifier 132. In the illustrated embodiment, the integrator amplifier 132 includes a capacitor 132-1 connected in parallel with an amplifier 132-2.

In some embodiments, the DDIC 104 may further include an analog-digital converter (ADC) 135 coupled to the integrator amplifier 132 and configured to obtain and convert the sensed voltage signal into the sensing value for storage in the RRAM 140. For example, the ADC 135 may convert the analog sensed voltage signal into digital value(s) for storage in a RRAM 140 programmed in the digital mode.

The DDIC 104 provides a fast compensation scheme as the RRAM 140 may be embedded in the DDIC 104. Because each memory cell in the RRAM 140 may consist of one transistor, the RRAM 140 consumes less chip area and thus reduces the cost for making the DDIC 104. Further, the RRAM 140 is non-volatile and uses less power than conventional memories such as SRAM. The techniques disclosed herein provide the DDIC 104 with improved performance and reduced cost.

Figure 2:
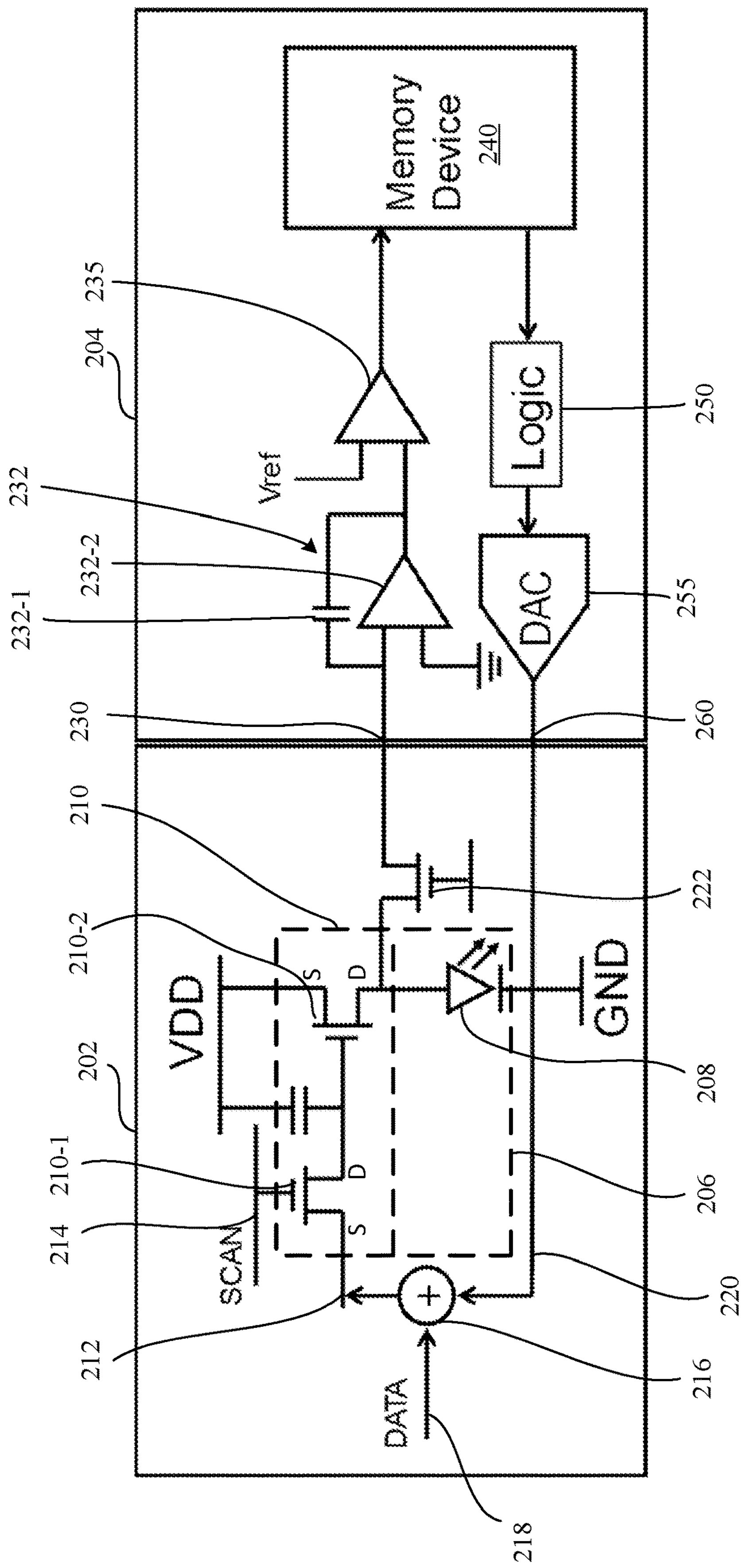
FIG. 2 is a diagram illustrating another display device that includes a display driver integrated circuit, according to one example embodiment.

Reference is now made to FIG. 2. FIG. 2 is a diagram illustrating a display device 200, according to one example embodiment. The display device 200 includes a display panel 202 and a DDIC 204. The display panel 202 includes a pixel array having a plurality of pixels. One example pixel 206 is shown in FIG. 2. The pixel 206 includes a display element 208 and a display-pixel driving element 210 configured to control the display element 208. The display-pixel driving element 210 includes two thin-film transistors 210-1 and 210-2. The pixel 206 is connected to a data line 212 to receive a data signal/display control signal and to a scan line 214 to receive a scan signal (SCAN). Although not shown in FIG. 2, the display panel 202 includes a plurality of data lines 212 and a plurality of scan lines 214. The display panel 202 further includes a data source 216 that provides the data signal based on a display data input (DATA) 218 and a compensation signal 220 provided by the DDIC 204. The display panel 202 further includes a sensing element 222. The display panel 202 is similar to the display panel 102 in FIG. 1 and detailed description for the display panel 202 may be referred to those for the display panel 102.

The DDIC 204 includes the input port 230, an integrator amplifier 232, a comparator 235, a memory device 240, a display compensation logic 250, a DAC 255, and an output port 260. The input port 230 is configured to receive a display sensing signal for the display panel 202. For example, the input port 230 may receive the display sensing signal from the sensing element 222 of the display panel 202. The integrator amplifier 232 is coupled to the input port 230 and configured to convert display sensing signal received from the input port 230 to a sensed voltage signal. For example, an output of the sensing element 222 may provide a current signal (displaying sensing signal) to the input port 230 of the DDIC. This current signal is converted to a voltage signal (sensed voltage signal) at the integrator amplifier 232. In the illustrated embodiment, the integrator amplifier 232 includes a capacitor 232-1 connected in parallel with an amplifier 232-2.

The comparator 235 is coupled to the integrator amplifier 232 and configured to obtain and compare the sensed voltage signal with one or more reference voltage signals (Vref) and to generate a digital value as a sensing value for storage in the memory device 240. For example, in a simplest form, the comparator 235 may compare the sensed voltage signal with a reference voltage signal. The comparator 235 may generate a logic 1 to indicate that the sensed voltage signal is greater than the reference voltage signal and generate a logic 0 to indicate that the sensed voltage signal is not greater than the reference voltage signal. For example, the logic 1 may indicate that the display pixel is functioning normal and no compensation is needed, while the logic 0 may indicate that the display pixel is degraded and warrants a compensation mechanism to boost the emission of the display pixel, or vice versa. The comparator 235 may then send this one-bit digital data to the memory device 240 for storage. In some embodiments, the comparator 235 may compare the sensed voltage signal with multiple reference voltage signals and generate a multibit digital value to indicate a level of compensation for the display pixel.

The memory device 240 is coupled to the input port 230 through the integrator amplifier 232 and the comparator 235. The memory device 240 is configured to store a sensing value indicative of the display sensing signal received at the input port 230. In the illustrated embodiment, the memory device 240 is connected to the comparator 235 to receive and store the sensing value generated by the comparator 235. The memory device 240 includes a resistive random access memory (RRAM). The RRAM 240 may be operated in a digital mode, an analog mode, or a mixed digital-analog mode. In the illustrated embodiment in FIG. 2, the RRAM 240 is programmed in the digital mode or mixed digital-analog mode to store the digital sensing values generated by the comparator 235.

The display compensation logic 250 is coupled to the RRAM 240 to receive the sensing value and configured to determine, based on the sensing value, a compensation value to enable the display panel 202 to modify a display control signal (e.g., DATA). For example, the display compensation logic 250 may be programmed to include a look-up table for the compensation value. The display compensation logic 250 may read the sensing value and determine a corresponding compensation value based on the look-up table. In some embodiments, the display compensation logic 250 may be integrated with the RRAM 240.

The DAC 255 is coupled to the display compensation logic 250 and configured to convert the compensation value received from the display compensation logic 250 into a display compensation voltage signal 220. For example, the compensation value received from the display compensation logic 250 may be a digital value indicating a level of compensation for the display pixel 206. The DAC 255 converts the digital value into the analog display compensation voltage signal 220, which can be used by the data source 216 in the display panel 202 to generate a data signal for the display pixel 206.

The output port 260 is coupled to the display compensation logic 250 through the DAC 255 to transmit the display compensation voltage signal 220 to the display panel 202. The data source 216 in the display panel 202 receives the display compensation voltage signal 220 and the display data input 218 to generate the data signal for the display pixel 206 in the display panel 202.

The DDIC 204 provides an efficient, fast compensation scheme as the RRAM 240 may be embedded in the DDIC 204. The comparator 235 included in the DDIC 204 generates sensing values that may include fewer digits than the output of the ADC 135 (FIG. 1) that generates a digital value indicative of a voltage signal. Because each memory cell in the RRAM 240 may consist of one transistor, the RRAM 240 consumes less chip area and thus saves the cost for making the DDIC 204. Further, the RRAM 240 is non-volatile and uses less power than conventional memories such as SRAM. The techniques disclosed herein provide the DDIC 204 with improved performance and reduced cost.

Figure 3:
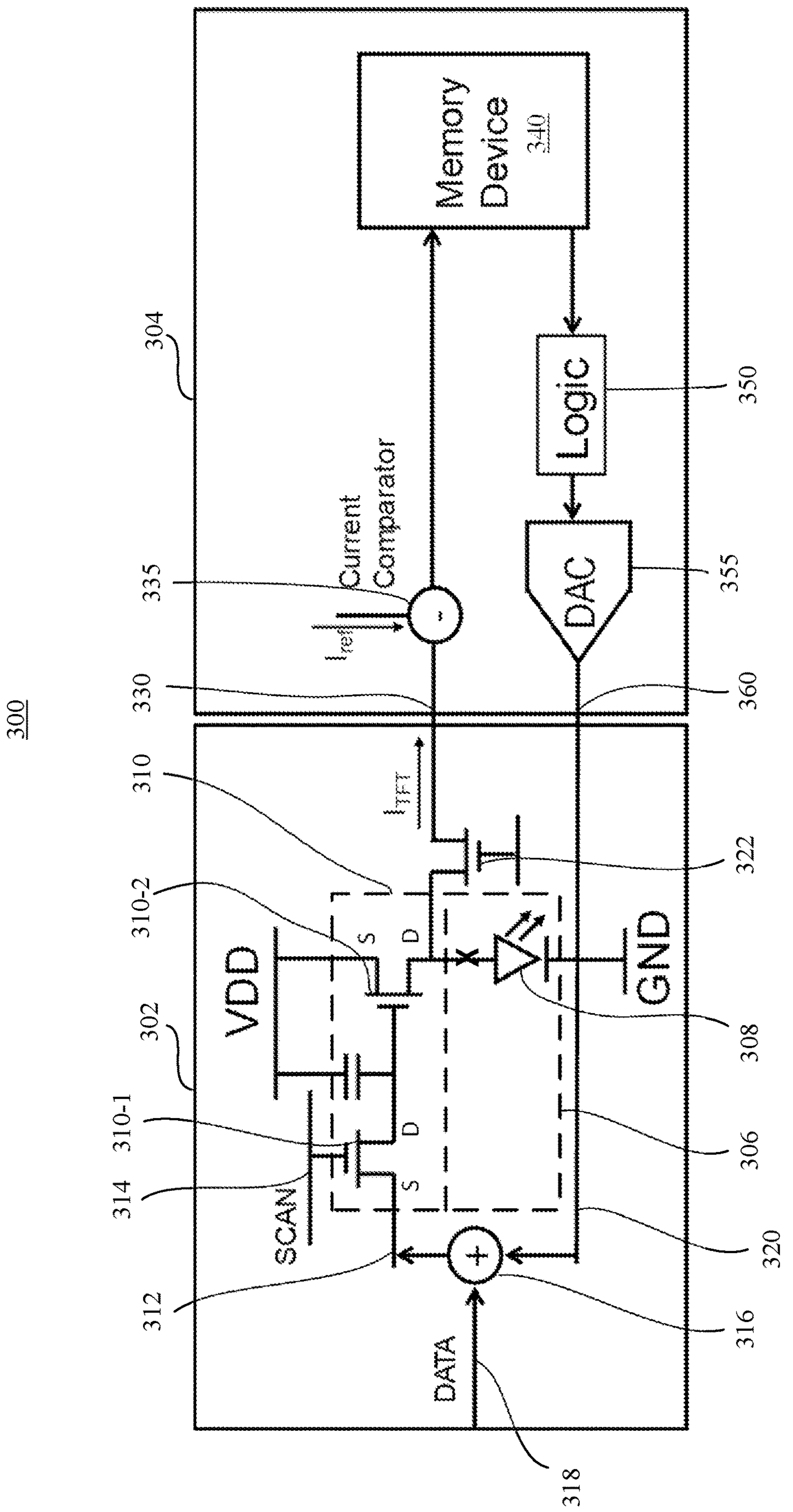
FIG. 3 is a diagram illustrating yet another display device that includes a display driver integrated circuit, according to one example embodiment.

FIG. 3 is a diagram illustrating a display device 300, according to one example embodiment. The display device 300 includes a display panel 302 and a DDIC 304. The display panel 302 includes a pixel array having a plurality of pixels. One example pixel 306 is shown in FIG. 3. The pixel 306 includes a display element 308 and a display-pixel driving element 310 configured to control the display element 308. The display-pixel driving element 310 includes two thin-film transistors 310-1 and 310-2. The pixel 306 is connected to a data line 312 to receive a data signal/display control signal and to a scan line 314 to receive a scan signal (SCAN). Although not shown in FIG. 3, the display panel includes a plurality of data lines 312 and a plurality of scan lines 314. The display panel 302 further includes a data source 316 that provides the data signal based on a display data input (DATA) 318 and a compensation signal 320 provided by the DDIC 304. The display panel 302 further includes a sensing element 322. The display panel 302 is similar to the display panel 102 in FIG. 1 and detailed description for the display panel 302 may be referred to those for the display panel 102.

The DDIC 304 includes the input port 330, a current comparator 335, a memory device 340, a display compensation logic 350, a DAC 355, and an output port 360. The input port 330 is configured to receive a display sensing signal for the display panel 302. For example, the input port 330 may receive the display sensing signal from the sensing element 322 of the display panel 302. In the illustrated embodiment, the display element 308 is disconnected such that the display sensing signal is a current signal indicative of a current flowing through the display-pixel driving element 310-2 that is coupled to the display element 308.

The current comparator 335 is coupled to the input port 330 and configured to obtain and compare the display sensing signal with a reference current signal ($I_{ref}$) and to generate a digital value as a sensing value for storage in the memory device 340.

For example, in a simplest form, the current comparator 335 may compare the display sensing signal with one reference current signal. The comparator 335 may generate a logic 1 to indicate that the display sensing signal is greater than the reference current signal and generate a logic 0 to indicate that the display sensing signal is not greater than the reference current signal. For example, the logic 1 may indicate that the display-pixel driving element 310-2 is functioning normally and no compensation is needed, while the logic 0 may indicate that the display-pixel driving element 310-2 is degraded and warrants a compensation mechanism to boost the emission of the display pixel 306. The current comparator 335 may then send this one-bit digital data to the memory device 340 for storage. In some embodiments, the current comparator 335 may compare the display sensing signal with multiple reference current signals and generate a multibit digital value to indicate a level of compensation for the display pixel 306. Under this scheme, multiple levels of compensation may be predetermined for the display panel 302.

The memory device 340 is coupled to the input port 330 through the current comparator 335. The memory device 340 is configured to store a sensing value indicative of the display sensing signal received at the input port 330. In the illustrated embodiment, the memory device 340 is connected to the current comparator 335 to receive and store the sensing value generated by the current comparator 335. The memory device 340 includes an RRAM. The RRAM 340 may be operated in a digital mode, an analog mode, or a mixed digital-analog mode. In the illustrated embodiment in FIG. 3, the RRAM 340 is programmed in the digital mode or mixed digital-analog mode to store the digital sensing values generated by the current comparator 335.

The display compensation logic 350 is coupled to the RRAM 340 to receive the sensing value and configured to determine, based on the sensing value, a compensation value to enable the display panel 302 to modify a display control signal (e.g., DATA). For example, the display compensation logic 350 may be programmed to include a look-up table for the compensation values. The display compensation logic 350 may read the sensing value and determine a corresponding compensation value based on the look-up table. In some embodiments, the display compensation logic 350 may be integrated with the RRAM 340.

The DAC 355 is coupled to the display compensation logic 350 and configured to convert the compensation value received from the display compensation logic 350 into a display compensation voltage signal. For example, the compensation value received from the display compensation logic 350 may be a digital value indicating a level of compensation for the display pixel 306. The DAC 355 converts the digital value into the analog display compensation voltage signal, which can be used by the data source 318 in the display panel 302 to generate a data signal for the display pixel 306.

The output port 360 is coupled to the display compensation logic 350 through the DAC 355 to transmit the display compensation voltage signal to the display panel 302. The data source 318 in the display panel 302 receives the display compensation voltage signal 320 and the display data input (DATA) 318 to generate the data signal for the display pixel 306 in the display panel 302.

The DDIC 304 provides an efficient, fast compensation scheme as the RRAM 340 may be embedded in the DDIC 304. The current comparator 335 included in the DDIC 304 generates sensing values that may include fewer digits than the output of the ADC 135 (FIG. 1) that generates a digital value indicative of a voltage signal. Because each memory cell in the RRAM 340 may consist of one transistor, the RRAM 340 consumes fewer chip areas and thus saves the cost for making the DDIC 304. Further, the RRAM 340 is non-volatile and uses less power than conventional memories such as SRAM. The techniques disclosed herein provide the DDIC 304 with improved performance and reduced cost.

Figure 4:
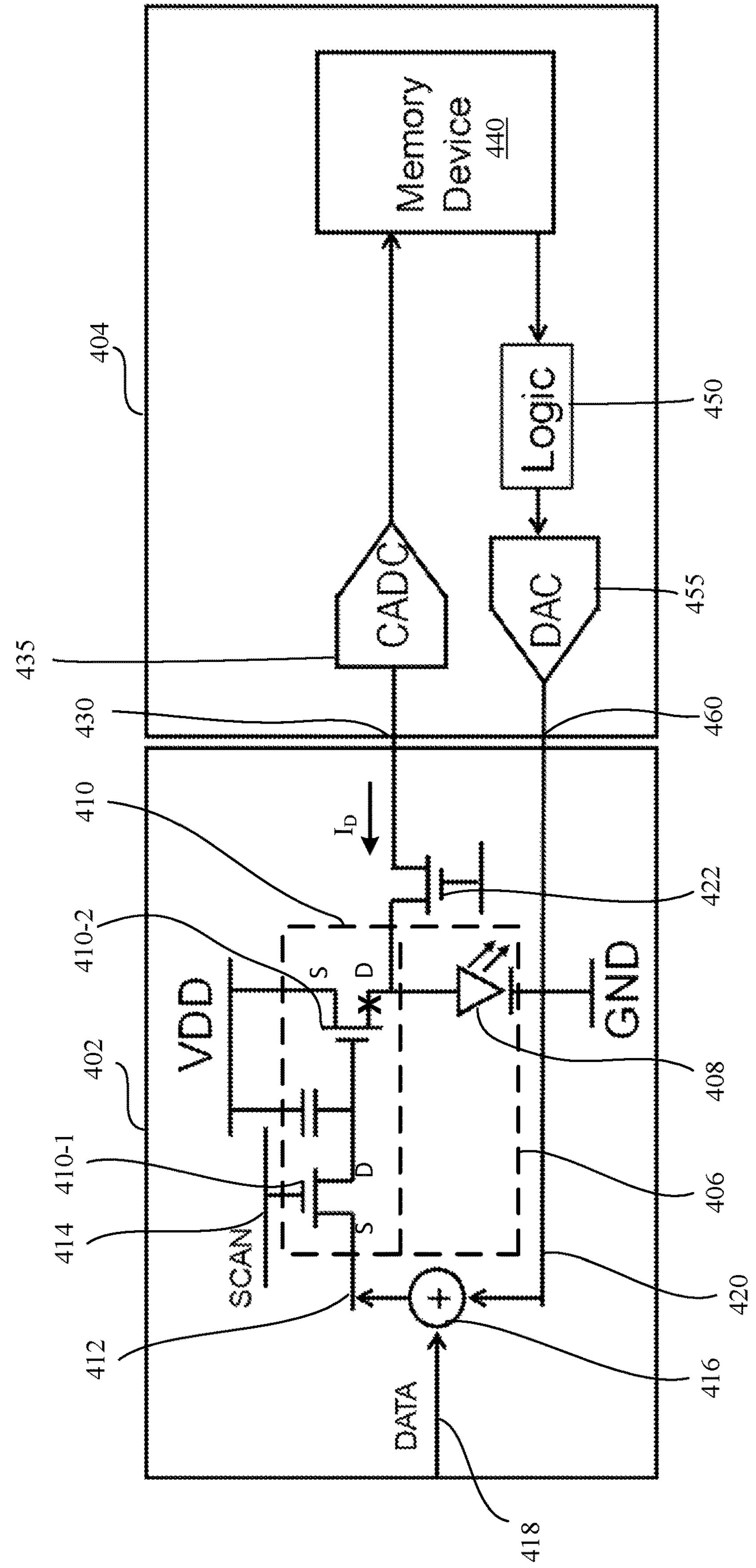
FIG. 4 is a diagram illustrating yet another display device that includes a display driver integrated circuit, according to one example embodiment.

FIG. 4 is a diagram illustrating another display device 400, according to one example embodiment. The display device 400 includes a display panel 402 and a DDIC 404. The display panel 402 includes a pixel array having a plurality of pixels. One example pixel 406 is shown in FIG. 4. The pixel 406 includes a display element 408 and a display-pixel driving element 410 configured to control the display element 408. The display-pixel driving element 410 includes two thin-film transistors 410-1 and 410-2. The pixel 406 is connected to a data line 412 to receive a data signal/display control signal and to a scan line 414 to receive a scan signal (SCAN). Although not shown in FIG. 4, the display panel includes a plurality of data lines 412 and a plurality of scan lines 414. The display panel 402 further includes a data source 416 that provides the data signal based on a display data input (DATA) 418 and a compensation signal 420 provided by the DDIC 404. The display panel 402 further includes a sensing element 422. The display panel 402 is similar to the display panel 102 and detailed description for the display panel 402 may be referred to those for the display panel 102.

The DDIC 404 includes the input port 430, a current ADC (CADC) 435, a memory device 440, a display compensation logic 450, a DAC 455, and an output port 460. The input port 430 is configured to receive a display sensing signal for the display panel 402. For example, the input port 430 may receive the display sensing signal ID flowing through the sensing element 422 of the display panel 402. In the illustrated embodiment, the display-pixel driving element 410-2 is disconnected such that the display sensing signal is a current signal indicative of a current flowing through the display element 408.

The CADC 435 is coupled to the input port 430 and configured to convert the display sensing signal ID into the sensing value for storage in the resistive random access memory.

The memory device 440 is coupled to the input port 430 through the CADC 435. The memory device 440 is configured to store a sensing value indicative of the display sensing signal received at the input port 430. In the illustrated embodiment, the memory device 440 is connected to the CADC 435 to receive and store the sensing value generated by the CADC 435. The memory device 440 includes an RRAM. The RRAM 440 may be operated in a digital mode, an analog mode, or a mixed digital-analog mode. In the illustrated embodiment in FIG. 4, the RRAM 440 is programmed in the digital mode or mixed digital-analog mode to store the digital sensing values generated by the CADC 435.

The display compensation logic 450 is coupled to the RRAM 440 to receive the sensing value and configured to determine, based on the sensing value, a compensation value to enable the display panel 402 to modify a display control signal (e.g., DATA). For example, the display compensation logic 450 may be programmed with a look-up table for the compensation value. The display compensation logic 450 may read the sensing value and determine a corresponding compensation value based on the look-up table. In some embodiments, the display compensation logic 450 may be integrated with the RRAM 440.

The DAC 455 is coupled to the display compensation logic 450 and configured to convert the compensation value received from the display compensation logic 450 into a display compensation voltage signal 420. For example, the compensation value received from the display compensation logic 450 may be a digital value indicating a level of compensation for the display pixel 406. The DAC 455 converts the digital value into the analog display compensation voltage signal 420, which can be used by the data source 418 in the display panel 402 to generate a data signal for the display pixel 406.

The output port 460 is coupled to the display compensation logic 450 through the DAC 455 to transmit the display compensation voltage signal 420 to the display panel 402. The data source 418 in the display panel 402 receives the display compensation voltage signal 420 and the display data input 418 to generate the data signal for the display pixel 406 in the display panel 402.

The DDIC 404 provides an efficient, fast compensation scheme as the RRAM 440 may be embedded in the DDIC 404. Because each memory cell in the RRAM 440 may consist of one transistor, the RRAM 440 consumes less chip area and, thus, saves the cost for making the DDIC 404. Further, the RRAM 440 is non-volatile and uses less power than conventional memories such as SRAM. The techniques disclosed herein provide the DDIC 404 with improved performance and reduced cost.

FIG. 5 is a diagram illustrating another display device 500, according to one example embodiment. The display device 500 includes a display panel 502 and a DDIC 504. The display panel 502 includes a pixel array having a plurality of pixels. One example pixel 506 is shown in FIG. 5. The pixel 506 includes a display element 508 and a display-pixel driving element 510 configured to control the display element 508. The display-pixel driving element 510 includes two thin-film transistors 510-1 and 510-2. The pixel 506 is connected to a data line 512 to receive a data signal/display control signal and to a scan line 514 to receive a scan signal (SCAN). Although not shown in FIG. 5, the display panel includes a plurality of data lines 512 and a plurality of scan lines 514. The display panel 502 further includes a data source 516 that provides the data signal based on a display data input (DATA) 518 and a compensation signal 520 provided by the DDIC 504. The display panel 502 further includes a sensing element 522. The display panel 502 is similar to the display panel 102 in FIG. 1, and detailed description for the display panel 502 may be referred to those for the display panel 102.

The DDIC 504 includes the input port 530, an integrator amplifier 532, a first amplifier 535, a memory device 540, a second amplifier 550, and an output port 560. The input port 530 is configured to receive a display sensing signal for the display panel 502. For example, the input port 530 may receive the display sensing signal from the sensing element of the display panel 502. The integrator amplifier 532 is coupled to the input port 530 and configured to convert display sensing signal received from the input port 530 to a sensed voltage signal. For example, an output of the sensing element 522 may provide a current signal (displaying sensing signal) to the input port 530 of the DDIC 504. This current signal is converted to a voltage signal (sensed voltage signal) at the integrator amplifier 532. In the illustrated embodiment, the integrator amplifier 532 includes a capacitor 532-1 connected in parallel with an amplifier 532-2.

The first amplifier 535 is coupled to the integrator amplifier 532 and configured to amplify the sensed voltage signal to generate an analog sensing signal for storage in the memory device 540.

The memory device 540 is coupled to the first amplifier 535. The memory device 540 is configured to store the analog sensing signal. The memory device 540 includes an RRAM. In some embodiments, the first voltage amplifier 535 is configured to amplify the sensed voltage signal to generate the analog sensing signal based on resistive states of the resistive random access memory 540. For example, the sensed voltage signal generated by the integrator amplifier 532 may be about 1-3 Volts and the resistive states of the resistive random access memory 540 may be in a range of 10 kΩ-200 kΩ. The first voltage amplifier 535 may amplify the sensed voltage signal to 3-5 Volts as the analog sensing signal. In some embodiments, depending on the resistive states of the resistive random access memory 540, the first voltage amplifier 535 may increase or decrease the sensed voltage signal to generate the analog sensing signal for storage in the RRAM 540.

The RRAM 540 may be operated in a digital mode, an analog mode, or a mixed digital-analog mode. In the illustrated embodiment in FIG. 5, the RRAM 540 is programmed in the analog mode or the mixed digital-analog mode to store the analog sensing signal.

The second amplifier 550 is coupled to the RRAM 540 to receive the analog sensing signal and configured to amplify the analog sensing signal to generate a display compensation voltage signal 520, which can be used by the data source 518 in the display panel 502 to generate a data signal for the display pixel 506. Depending on the compensation scheme, the second amplifier 550 may increase or decrease an amplitude of the analog sensing signal to generate the display compensation voltage signal 520.

The output port 560 is coupled to the second amplifier 550 to transmit the display compensation voltage signal 520 to the display panel 502. The data source 518 in the display panel 502 receives the display compensation voltage signal 520 and the display data input 518 to generate the data signal for the display pixel 506 in the display panel 502.

The DDIC 504 provides an efficient, fast compensation scheme as the RRAM 540 may be embedded in the DDIC 504. The configuration of the DDIC 504 includes no ADC and DAC, which can reduce the cost of the DDIC 504. Also, because each memory cell in the RRAM 540 may consist of fewer transistor(s) than the conventional memory devices, the RRAM 540 consumes less chip area and, thus, saves the cost for making the DDIC 504. Further, the RRAM 540 is non-volatile and uses less power than conventional memories such as SRAM. The techniques disclosed herein provide the DDIC 504 with improved performance and reduced cost.

Although specific example embodiments are provided herein, various modifications to the example embodiments are contemplated. For example, the individual components in one embodiment may be combined with components in other embodiments. The individual components in one embodiment may also be omitted when such omission is consistent with the spirit of this disclosure.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A display driver integrated circuit, comprising:

an input port configured to receive a display sensing signal for a display panel;

a circuit configured to generate a digital sensing value indicative of the display sensing signal;

a resistive random access memory coupled to the input port and configured to store the digital sensing value;

a display compensation logic coupled to the resistive random access memory to receive the digital sensing value from the resistive random access memory and configured to determine, based on the received digital sensing value, a compensation value to enable the display panel to modify a display control signal; and an output port coupled to the display compensation logic to transmit a display compensation voltage signal to the display panel, wherein the display compensation voltage signal is generated based on the compensation value.

2. The display driver integrated circuit of claim 1, further comprising:

a digital-analog converter coupled to the display compensation logic and configured to convert the compensation value into the display compensation voltage signal.

3. The display driver integrated circuit of claim 2, further comprising:

an integrator amplifier coupled to the input port and configured to convert the display sensing signal to a sensed voltage signal.

4. The display driver integrated circuit of claim 3, further comprising:

an analog-digital converter coupled to the integrator amplifier and configured to convert the sensed voltage signal into the digital sensing value.

5. The display driver integrated circuit of claim 3, further comprising:

a comparator coupled to the integrator amplifier and configured to obtain and compare the sensed voltage signal with a reference voltage signal, and to generate a digital value as the digital sensing value based on the comparing for storage in the resistive random access memory.

6. The display driver integrated circuit of claim 2, further comprising:

a current comparator coupled to the input port and configured to obtain and compare the display sensing signal with a reference current signal, and to generate a digital value as the digital sensing value based on the comparing for storage in the resistive random access memory, wherein the display sensing signal is indicative of a current flowing through a display- pixel driving element of a display pixel of the display panel.

7. The display driver integrated circuit of claim 2, further comprising:

a current analog-digital converter coupled to the input port, and configured to convert the display sensing signal into the digital sensing value for storage in the resistive random access memory, wherein the display sensing signal is indicative of a current flowing through a display pixel of the display panel.

8. The display driver integrated circuit of claim 1, wherein the display sensing signal is indicative of a current flowing through a display pixel of the display panel and a display-pixel driving element coupled to the display pixel.

9. A display driver integrated circuit, comprising:

an input port configured to receive a display sensing signal for a display panel;

an integrator amplifier coupled to the input port, and configured to convert the display sensing signal to a sensed voltage signal;

a first voltage amplifier coupled to the integrator amplifier and configured to amplify the sensed voltage signal to generate an analog sensing signal;

a resistive random access memory coupled to the first voltage amplifier and configured to store the analog sensing signal;

a second voltage amplifier coupled to the resistive random access memory and configured to receive the analog sensing signal from the resistive random access memory and amplify the received analog sensing signal to generate a display compensation voltage signal; and an output port coupled to the second voltage amplifier to transmit the display compensation voltage signal to the display panel.

10. The display driver integrated circuit of claim 9, wherein the first voltage amplifier is configured to amplify the sensed voltage signal to generate the analog sensing signal based on resistive states of the resistive random access memory.

11. A display device, comprising:

a display panel; and a display driver integrated circuit coupled to the display panel to control the display panel, wherein the display driver integrated circuit comprises:

a circuit configured to generate a digital sensing value indicative of a display sensing signal;

an input port configured to receive the display sensing signal for the display panel;

a resistive random access memory coupled to the input port and configured to store the digital sensing value;

a display compensation logic coupled to the resistive random access memory to receive the digital sensing value from the resistive random access memory and configured to determine, based on the received digital sensing value, a compensation value to enable the display panel to modify a display control signal; and an output port coupled to the display compensation logic to transmit a display compensation voltage signal to the display panel, wherein the display compensation voltage signal is generated based on the compensation value.

12. The display device of claim 11, wherein the display driver integrated circuit further comprises:

a digital-analog converter coupled to the display compensation logic and configured to convert the compensation value into the display compensation voltage signal.

13. The display device of claim 12, wherein the display driver integrated circuit further comprises:

a current comparator coupled to the input port and configured to obtain and compare the display sensing signal with a reference current signal, and to generate a digital value as the digital sensing value for storage in the resistive random access memory, wherein the display sensing signal is indicative of a current flowing through a display-pixel driving element coupled to a display pixel of the display panel.

14. The display device of claim 12, wherein the display driver integrated circuit further comprises:

a current analog-digital converter coupled to the input port and configured to convert the display sensing signal into the digital sensing value for storage in the resistive random access memory, wherein the display sensing signal is indicative of a current flowing through a display pixel of the display panel.

15. The display device of claim 12, wherein the display driver integrated circuit further comprises:

an integrator amplifier coupled to the input port and configured to convert the display sensing signal to a sensed voltage signal.

16. The display device of claim 15, wherein the display driver integrated circuit further comprises:

an analog-digital converter coupled to the integrator amplifier and configured to obtain and convert the sensed voltage signal into the digital sensing value for storage in the resistive random access memory.

17. The display device of claim 15, wherein the display driver integrated circuit further comprises:

a comparator coupled to the integrator amplifier and configured to obtain and compare the sensed voltage signal with a reference voltage signal and to generate a digital value as the digital sensing value for storage in the resistive random access memory.

18. The display device of claim 11, wherein the display sensing signal is indicative of a current flowing through a display pixel of the display panel and a display-pixel driving element coupled to the display pixel.

19. A display device, comprising:

a display panel; and a display driver integrated circuit coupled to the display panel to control the display panel, wherein the display driver integrated circuit comprises:

an input port configured to receive a display sensing signal for the display panel;

an integrator amplifier coupled to the input port and configured to convert the display sensing signal to a sensed voltage signal;

a first voltage amplifier coupled to the integrator amplifier and configured to amplify the sensed voltage signal to generate an analog sensing signal;

a resistive random access memory coupled to the first voltage amplifier and configured to store the analog sensing signal;

a second voltage amplifier coupled to the resistive random access memory and configured to receive the analog sensing signal from the resistive random access memory and amplify the received analog sensing signal to generate a display compensation voltage signal; and an output port coupled to the second voltage amplifier to transmit the display compensation voltage signal to the display panel.

20. The display device of claim 19, wherein the first voltage amplifier is configured to amplify the sensed voltage signal to generate the analog sensing signal based on resistive states of the resistive random access memory.

21. A display driver integrated circuit, comprising:

an input port configured to receive a display sensing signal for a display panel;

a first circuit configured to generate a sensing data indicative of the display sensing signal, wherein the sensing data comprises an analog sensing data;

a resistive random access memory coupled to the first circuit and configured to store the sensing data;

a second circuit coupled to the resistive random access memory and configured to receive the sensing data from the resistive random access memory and to generate a display compensation signal based on the received sensing data, wherein the second circuit comprises: a second voltage amplifier coupled to the resistive random access memory and configured to receive the analog sensing data from the resistive random access memory and amplify the received analog sensing data to generate a display compensation signal; and an output port coupled to the second circuit to transmit the display compensation signal to the display panel.

22. The display driver integrated circuit of claim 21, wherein the first circuit comprises:

an integrator amplifier coupled to the input port, and configured to convert the display sensing signal to a sensed voltage signal; and a first voltage amplifier coupled to the integrator amplifier and configured to amplify the sensed voltage signal to generate the analog sensing data based on resistive states of the resistive random access memory.

23. The display driver integrated circuit of claim 21, wherein the first circuit is configured to convert the display sensing signal to a sensed current signal and convert the sensed current signal to generate the analog sensing data based on resistive states of the resistive random access memory.

24. The display driver integrated circuit of claim 21, wherein the display compensation signal is a display compensation voltage signal.

25. A display driver integrated circuit, comprising:

an input port configured to receive a display sensing signal for a display panel;

a first circuit configured to generate a sensing data indicative of the display sensing signal;

a resistive random access memory coupled to the first circuit and configured to store the sensing data, wherein the resistive random access memory is configured to operate in a mixed digital-analog mode, and the sensing data comprises an analog sensing data and an digital sensing data;

a second circuit coupled to the resistive random access memory and configured to receive the sensing data from the resistive random access memory and to generate a display compensation signal based on the received sensing data, wherein the second circuit comprises a display compensation logic coupled to the resistive random access memory to receive the digital sensing data from the resistive random access memory and configured to determine, based on the received digital sensing data, a compensation value to enable the display panel to modify a display control signal; and an output port coupled to the second circuit to transmit the display compensation signal to the display panel.

26. The display driver integrated circuit of claim 25, wherein the analog sensing data is associated with a first display-pixel driving element of a first display pixel of the display panel, and the digital sensing data is associated with a second display-pixel driving element of a second display pixel of the display panel.

27. The display driver integrated circuit of claim 25, further comprising:

a digital-analog converter coupled to the display compensation logic and configured to convert the compensation value into the display compensation signal.

28. The display driver integrated circuit of claim 27, further comprising:

an integrator amplifier coupled to the input port and configured to convert the display sensing signal to a sensed voltage signal.

29. The display driver integrated circuit of claim 28, further comprising:

an analog-digital converter coupled to the integrator amplifier and configured to convert the sensed voltage signal into the digital sensing data.

30. The display driver integrated circuit of claim 28, further comprising:

a comparator coupled to the integrator amplifier and configured to obtain and compare the sensed voltage signal with a reference voltage signal, and to generate a digital value as the digital sensing data based on the comparing for storage in the resistive random access memory.

31. The display driver integrated circuit of claim 27, further comprising:

a current comparator coupled to the input port and configured to obtain and compare the display sensing signal with a reference current signal, and to generate a digital value as the digital sensing data based on the comparing for storage in the resistive random access memory, wherein the display sensing signal is indicative of a current flowing through a display-pixel driving element of a display pixel of the display panel.

32. The display driver integrated circuit of claim 27, further comprising:

a current analog-digital converter coupled to the input port, and configured to convert the display sensing signal into the digital sensing data for storage in the resistive random access memory, wherein the display sensing signal is indicative of a current flowing through a display pixel of the display panel.

33. The display driver integrated circuit of claim 25, wherein the display sensing signal is indicative of a current flowing through a display pixel of the display panel and a display-pixel driving element coupled to the display pixel.

34. The display driver integrated circuit of claim 27, wherein the display compensation signal is a display compensation voltage signal.

35. A display device, comprising:

a display panel; and a display driver integrated circuit coupled to the display panel to control the display panel, wherein the display driver integrated circuit comprises:

an input port configured to receive a display sensing signal for the display panel;

a first circuit configured to generate a sensing data indicative of the display sensing signal, wherein the sensing data comprises an analog sensing data;

a resistive random access memory coupled to the first circuit and configured to store the sensing data;

a second circuit coupled to the resistive random access memory and configured to receive the sensing data from the resistive random access memory and to generate a display compensation signal based on the received sensing data, wherein the second circuit comprises: a second voltage amplifier coupled to the resistive random access memory and configured to receive the analog sensing data from the resistive random access memory and amplify the received analog sensing data to generate a display compensation signal; and an output port coupled to the second circuit to transmit the display compensation signal to the display panel.

* * * * *